(12) United States Patent
Moireau et al.

(10) Patent No.: US 6,514,612 B1
(45) Date of Patent: Feb. 4, 2003

(54) GLASS FIBRE COATING COMPOSITION, METHOD USING SAID COMPOSITION AND RESULTING PRODUCT

(75) Inventors: Patrick Moireau, Curienne; Marc Roubin, Chambery, both of (FR)

(73) Assignee: Vetrotex France, Chambery (FR)

( * ) Notice: Subject to any disclaimer, the term of this patent is extended or adjusted under 35 U.S.C. 154(b) by 0 days.

(21) Appl. No.: 09/581,910

(22) PCT Filed: Dec. 17, 1998

(86) PCT No.: PCT/FR98/02757
§ 371 (c)(1),
(2), (4) Date: Sep. 12, 2000

(87) PCT Pub. No.: WO99/31025
PCT Pub. Date: Jun. 24, 1999

(30) Foreign Application Priority Data

Dec. 17, 1997 (FR) ............................................ 97/15994

(51) Int. Cl.⁷ ............................ D02G 3/00; B05D 3/02; B29C 47/88
(52) U.S. Cl. ....................... 428/392; 428/375; 428/378; 428/391; 65/381; 65/382; 65/384; 427/385.5; 427/389.7; 427/178; 264/211.12
(58) Field of Search .................. 428/375, 378, 428/392, 391; 65/432, 430, 377, 381, 382, 384; 427/385.5, 389.7, 178; 264/211.12

(56) References Cited

U.S. PATENT DOCUMENTS

| | | | |
|---|---|---|---|
| 4,244,844 A | * | 1/1981 | Molinier et al. ............. 428/391 |
| 5,352,392 A | | 10/1994 | Johnson et al. |
| 5,486,416 A | | 1/1996 | Johnson et al. |
| 5,601,882 A | | 2/1997 | Augier et al. |
| 5,611,836 A | | 3/1997 | Moireau |
| 5,698,000 A | | 12/1997 | Moireau et al. |
| 5,789,074 A | | 8/1998 | Moireau et al. |
| 5,882,792 A | | 3/1999 | Moireau |
| 5,955,195 A | | 9/1999 | Moireau |
| 5,961,684 A | | 10/1999 | Moireau et al. |
| 5,972,504 A | | 10/1999 | Moireau et al. |
| 5,985,447 A | | 11/1999 | Moireau |
| 5,989,711 A | | 11/1999 | Moireau et al. |
| 6,090,487 A | * | 7/2000 | Moireau ..................... 428/375 |
| 6,322,888 B1 | * | 11/2001 | Moireau et al. ............ 428/378 |

* cited by examiner

Primary Examiner—Cynthia H. Kelly
Assistant Examiner—J. M. Gray
(74) Attorney, Agent, or Firm—Oblon, Spivak, McClelland, Maier & Neustadt, P.C.

(57) ABSTRACT

The present invention relates to a sizing composition for a glass yarn, consisting of a solution whose solvent content is less than 5% by weight, this solution comprising at least 60% by weight of polymerizable components, at least 60% by weight of these polymerizable components being components with a molecular mass of less than 750 and these polymerizable components comprising at least one mixture capable of polymerizing:
  of component(s) containing at least one reactive acrylic function and/or at least one reactive methacrylic function, and
  of component(s) containing at least one reactive primary amine function and/or at least one reactive secondary amine function,
at least 20% of the polymerizable components containing at least two reactive functions chosen from acrylic, methacrylic, primary amine and secondary amine functions.

14 Claims, No Drawings

GLASS FIBRE COATING COMPOSITION, METHOD USING SAID COMPOSITION AND RESULTING PRODUCT

In the field of reinforcing yarns and composites, the present invention relates to glass yarns coated with a novel sizing composition, as well as to the composition in question, to the process for producing the yarns using this composition and to the composites made from the yarns.

Reinforcing glass yarns are manufactured, in a known manner, from molten glass threads flowing through die orifices. These threads are drawn in the form of continuous filaments and these filaments are then assembled into base yarns, which are then collected.

Before being assembled in the form of yarns, the filaments are coated with a sizing composition by passing them through a sizing member. This deposition is necessary in order to obtain the yarns and allows these yarns to be used effectively in the production of composites. Sizing has the following usual functions: it protects the yarns from abrasion and thus prevents them from breaking during their manufacture and, possibly, during their use; it furthermore allows the combination of yarns with organic and/or inorganic materials to be reinforced, by facilitating, in particular, the wetting and/or impregnation of the yarns by these materials. In most cases, sizing also enhances the adhesion between the glass and the material to be reinforced and allows composites to be obtained which have improved mechanical properties.

Sizing can also ensure the integrity of the yarns, i.e. the linking together of the filaments within the yarns. This integrity is especially desired in textile applications in which the yarns are subjected to high mechanical stresses. The reason for this is that, if the filaments are not very solidly attached to each other, they break more easily and disrupt the functioning of the textile machines. Non-integrated yarns are moreover considered as being difficult to handle.

Sizing compositions are chosen so as to fulfil the functions mentioned above and so as to resist the shear induced by the passage of the filaments at the drawing speeds (several tens of metres per second) and so as to wet the surface of the filaments at the said speeds. As a general rule, they are also chosen so as not to undergo chemical reactions giving rise to a large increase in viscosity at room temperature (during their storage) and at the die (polymerization of the sizing, for example, making it impossible to be deposited).

Most of the sizings commonly used are aqueous sizings which are simple to handle, but which need to be deposited in large amounts on the filaments in order to be effective. Water generally represents 90% by weight of these sizings (in particular for reasons of viscosity), thereby making it necessary to dry the yarns before they are used for reinforcing, since the water can be detrimental to the correct adhesion between the yarns and the materials to be reinforced. These drying operations are long and expensive, they need to be adapted to the conditions for manufacturing the yarns and they are not always of optimal efficacy. They can also entail risks of irregular and/or selective migration of the sizing components when they are carried out on packages and/or phenomena of coloration or deformation of the packages. This deformation is also observed, in the absence of drying, on the straight-edged packages (rovings) of fine yarns (i.e. yarns with a "yarn count" or "linear mass" of 300–600 tex (g/km) or less) coated with aqueous sizings.

Certain patents describe compositions which require no drying operations, such as anhydrous compositions. However, the number of these compositions which are suitable for coating glass yarns remains low in comparison with the number of existing aqueous compositions, and the choice among these compositions as a function of the desired application thus remains limited. In particular, among the compositions requiring no drying operations, there is at the current time no composition which allows the desired threads to be obtained in applications such as the manufacture of fascia (facade) reinforcement grilles, fabrics for vehicles, or hollow bodies by winding (i.e. by deposition, onto a rotating mould, of reinforcing yarns impregnated with resin), since these yarns need to have a better aptitude for impregnation than the reinforcing yarns most commonly used in other applications.

The present invention relates to a novel sizing composition which is suitable for advantageously coating glass yarns and which does not require drying of the yarns after it has been deposited, this composition giving yarns which are particularly suitable for impregnation with reinforcing materials, but nevertheless having enough integrity to be able to be handled, this composition thus making it possible to widen the field of sizings and to open the way to novel products and to novel applications.

The subject of the present invention is also novel sized glass yarns with the properties defined in the above paragraph, the said yarns being suitable for effectively reinforcing organic and/or inorganic materials for the production of composites, and, in particular, being particularly suitable for the manufacture of fascia reinforcement grilles, hollow bodies by winding and fabrics for vehicles.

The sizing composition according to the invention consists of a solution whose solvent content is less than 5% by weight, this solution comprising at least 60% by weight of polymerizable components, at least 60% by weight of these polymerizable components being components with a molecular mass of less than 750 and these polymerizable components comprising at least one mixture capable of polymerizing:

of component(s) containing at least one reactive acrylic function and/or at least one reactive methacrylic function, and of component(s) containing at least one reactive primary amine function and/or at least one reactive secondary amine function, at least 20% of the polymerizable components containing at least two reactive functions chosen from acrylic, methacrylic, primary amine and secondary amine functions.

Hereinbelow, the terms "(meth)acrylic component" and "primary and/or secondary amine component" are intended to refer, respectively, to a "component containing at least one reactive acrylic function and/or at least one reactive methacrylic function" and a "component containing at least one reactive primary amine function and/or at least one reactive secondary amine function". Similarly, the term "reactive function" is intended to refer to a function capable of participating in the polymerization reaction of the mixture and the terms "polymerization" and "polymerize" are intended to refer, respectively, to "polymerization and/or crosslinking" and "polymerize and/or crosslink", it being possible for the polymerization to take place at room temperature or under heat. Lastly, according to the invention, the term "composition comprising . . . " is intended to refer to a composition in which the initial constituents are . . . " or alternatively "composition formed of . . . ".

In the composition according to the invention, the optional solvent(s) is(are) essentially one (or more) organic solvent(s) required for the dissolution of certain polymerizable compounds. The presence of solvents in limited amount does not require specific treatments to remove them; in most cases, the sizings according to the invention are, in addition, totally free of solvents, i.e. of compounds acting solely as solvent in the solution.

The polymerizable components, these components being essential for the sizing and forming part of the structure of the polymerized sizing, represent between 60 and 100% by weight of the sizing composition according to the invention, mainly between 70 and 99.5% by weight of the composition, and in most cases between 75 and 90% by weight of the composition. These polymerizable components are more conveniently referred to collectively hereinafter as the "base system".

Preferably, the base system consists mainly (i.e. to more than 50%, preferably to at least 75% by weight and up to 100% by weight in most cases) of (meth)acrylic component(s) and of primary and/or secondary amine component(s), the use of this mixture of components giving, after polymerization, copolymers which form an appreciable part of the structure of the polymerized sizing, and which give specific properties to the sized glass yarns made.

In addition, the base system comprises a majority (more than 50%, preferably at least 70% and up to 100% by weight) of component(s) with a molecular mass of less than 750. In particular, most (more than 50%, preferably at least 70% and up to 100% by weight) of the (meth)acrylic component(s) and primary and/or secondary amine component(s) of the composition generally have a molecular mass of less than 750. It should be pointed out in this respect that the various contents indicated in the definition of the invention are evaluated independently of each other, it being possible for the same component to satisfy several of the conditions indicated in the definition of the invention and thus be able to be taken into consideration for evaluating several contents.

Preferably and in general according to the invention, the components with a molecular mass of less than 750 mentioned above have a molecular mass of less than 500. Similarly, in most of the cases according to the invention and in a preferred manner, these components are monomers (mono- or polyfunctional monomers, as explained later), but the base system can also comprise components with a molecular mass of less than 750 in the form of oligomers or polymers containing partially polymerized functions.

According to certain embodiments, the base system according to the invention can optionally comprise a small proportion of component(s) which form part of the structure of the polymerized sizing but which contain no (meth)acrylic or amine functions as defined above (for example one or more components containing at least one epoxy function) and/or which have a higher molecular mass.

According to the preferred embodiment of the invention for obtaining particularly satisfactory results, the base system consists solely of (meth)acrylic component(s) and of amine component(s) and/or, optionally, consists solely of components with a molecular mass of less than 750.

The polymerizable components of the composition according to the invention can contain one or more reactive functions. The expression "polyfunctional (meth)acrylic component" is intended hereinbelow to refer to a "component containing at least two reactive functions chosen from acrylic and methacrylic functions". Similarly, the expression "polyfunctional primary and/or secondary amine component" is intended hereinbelow to refer to a "component containing at least two reactive functions chosen from primary amine and secondary amine functions" and "polyfunctional (meth)acrylic and/or primary amine and/or secondary amine component" is intended hereinbelow to refer to a "component containing at least two reactive functions chosen from acrylic, methacrylic, primary amine and secondary amine functions". According to the invention, the base system comprises at least 20% of (meth)acrylic and/or primary amine and/or secondary amine polyfunctional component(s). Preferably, it comprises between 30 and 100% by weight, in a particularly preferred manner between 35 and 95% by weight, of (meth)acrylic and/or primary amine and/or secondary amine polyfunctional component(s), this (these) polyfunctional component(s) preferably being chosen from the following components: components containing at least two reactive acrylic functions, components containing at least two reactive methacrylic functions, components containing at least two reactive primary amine functions, components containing at least two reactive secondary amine functions, components containing at least one reactive acrylic function and at least one reactive methacrylic function, components containing at least one reactive primary amine function and at least one reactive secondary amine function.

In a particularly preferred manner, the base system comprises at least one (meth)acrylic polyfunctional component. In advantageous embodiments of the present invention, the content of (meth)acrylic polyfunctional component(s) is at least 20% by weight of the base system.

Also preferably according to the invention, the base system of the composition comprises at least one acrylic or methacrylic or primary or secondary amine monofunctional component, i.e. a component in which the number of functions chosen from acrylic, methacrylic, primary amine and secondary amine functions is equal to one.

As non-limiting examples, the (meth)acrylic component(s) of the composition can be one (or more) of the following components: alkyl (meth)acrylate containing a $C_4$–$C_{20}$ aliphatic chain, cyclohexyl- or 2-(2-ethoxyethoxy) ethyl- or 2-phenoxyethyl- or isobornyl- or tetrahydrofurfuryl- or glycidyl- etc. (meth)acrylate, 2-hydroxyethyl isopropyl carbamate(meth)acrylate; 2-hydroxyethyloxazolidone (meth)acrylate; 1,4-butanediol- or neopentyl glycol- or polyethylene glycol- or polypropylene glycol- or 1,6-hexanediol- or bisphenol (A or F)- or diethyl carbonate- etc. di(meth)acrylate; trimethylolpropane- or pentaerythritol- or glycerylpropoxy- etc. tri(meth)acrylate; pentaerythritol- tetra(meth)acrylate; etc.

In general, according to the invention, the proportion of (meth)acrylic component(s) in the sizing composition is between 25 and 80%, preferably between 35 and 75%, by weight of the said composition. In most cases, it is between 40 and 70% by weight of the sizing composition. Preferably, the (meth)acrylic polyfunctional component(s) represent(s) at least 25% of this (these) (meth)acrylic component(s). As (meth)acrylic polyfunctional component(s), use is preferably made of one (or more) component(s) containing two functions chosen from acrylic and methacrylic functions (difunctional component(s)) and/or one (or more) component(s) containing three functions chosen from acrylic and methacrylic functions (trifunctional component(s)) and/or, optionally, one (or more) component (s) containing four functions chosen from acrylic and methacrylic functions (tetrafunctional component(s)). Preferably also, the base system comprises at least one acrylic or methacrylic monofunctional component.

As non-limiting examples, the primary and/or secondary amine component(s) of the composition can be one or more of the following components: isophoronediamine, methanediamine, N-aminoethylpiperazine, or para- or meta-phenylenedianiline, oxidianiline, diethyltoluenediamine, 4,4'-diaminodiphenylmethane, secondary amine containing a $C_4$–$C_{20}$ aliphatic chain, diisopentylamine, N-ethylmethallylamine, 1-(2-hydroxyethyl)-2-imidazolidinone, 2,6-dimethylmorpholine, 2-propylimidazole, 2,6-diaminopyridine, polyamidoamine, polyethylenepolyamine derivative, N'-(3-aminopropyl)-N,N'-dimethyl-1,3-propanediamine, 2-butyl-2-ethyl-1,5-pentanediamine, hexamethylenediamine, m-xylenediamine, amino alcohol, amidoamine (Mannich bases), etc.

As a general rule, according to the invention, the proportion of primary and/or secondary amine component(s) in the sizing composition is between 5 and 55%, preferably between 10 and 45%, by weight of the said composition. In most cases, it is between 15 and 35% by weight of the sizing composition. Preferably, the base system comprises at least one primary and/or secondary amine polyfunctional component (preferably at least one difunctional component, i.e. a component containing two functions chosen from primary and secondary amine functions) and/or at least one component comprising a primary amine function. Preferably also, the amine functions of the primary and/or secondary amine components are attached to aliphatic or cycloaliphatic chains (i.e. they do not form part of aromatic rings).

In many cases, the methacrylic component(s) and primary and/or secondary amine component(s) and their contents are chosen such that the ratio r corresponding to the number of (meth)acrylic reactive sites divided by the number of primary and/or secondary amine reactive sites in presence is between 0.2 and 3 (an acrylic function counting for a (meth)acrylic reactive site, a methacrylic function counting for a (meth)acrylic reactive site, a primary amine function counting for two primary and/or secondary amine reactive sites and a secondary amine function counting for one primary and/or secondary amine reactive site) to allow a sufficient polymerization of the sizing composition. In most cases, this ratio r is between 0.3 and 2 and is preferably between 0.4 and 1.8.

In one embodiment of the invention, the sizing composition comprises, in addition to the base system, at least one specific catalyst which promotes the sizing polymerization, mainly when the components of the base system are not very reactive. This catalyst can be chosen in particular from tertiary amines, tertiary amine derivatives and Lewis acids (for example from aliphatic amines of $BF_3$, such as the boron trifluoride/ethylamine complex, the Lewis acids optionally being combined with hydrogen donors such as propylene carbonate).

The content of specific component(s) defined above acting solely as catalyst(s) in the sizing composition is generally less than 8% by weight of the composition, in most cases less than 6% by weight, and is preferably less than or equal to 4.5% by weight of the sizing composition.

Besides the components essentially forming part of the structure of the polymerized sizing and optionally the specific catalyst(s), the composition according to the invention can comprise one or more components (denoted hereinbelow as additives) which give the sizing composition specific properties.

The composition according to the invention can comprise at least one coupling agent for attaching the sizing to the glass, as component(s) of the base system for the coupling agent(s) involved in the polymerization reaction and/or solely as additive(s) for the coupling agent(s) not involved in the polymerization reaction. The proportion of coupling agent(s) is preferably between 0 and 30% by weight of the said sizing composition and in most cases is greater than 5% by weight of the composition. Preferably, it is between 8 and 25% by weight of the sizing composition. The coupling agent(s) is(are) generally chosen from silanes such as gamma-glycidoxypropyltrimethoxysilane, gamma-methacryloxypropyltrimethoxysilane, polyethoxylated propoxylated trimethoxysilane, gamma-acryloxypropyltrimethoxysilane, vinyltrimethoxysilane, phenylaminopropyltrimethoxysilane, styrylaminoethylaminopropyltrimethoxysilane, tert-butylcarbamoylpropyltrimethoxysilane, etc. It(they) can also optionally be chosen from titanates, zirconates, siloxanes, etc.

The composition according to the invention can also comprise, generally as additive not involved in the polymerization reaction, at least one textile working agent acting essentially as lubricant, in proportions of between 0 and 25% by weight and preferably in proportions of greater than 1% (and preferably less than 20%), and in a particularly preferred manner in proportions of greater than 5% by weight. The textile agent(s) can be chosen from the following components: fatty esters, glycol derivatives (in particular ethylene or propylene glycol derivatives), mixtures based on mineral oils, etc., for example isopropyl or cetyl palmitates, isobutyl stearates, decyl laurates, ethylene glycol adipates, polyethylene glycols or polypropylene glycols with a molecular weight of less than 2000, isopropyl stearates, etc.

The composition according to the invention can also comprise, generally as additive not involved in the polymerization reaction, at least one film-forming agent acting solely as a slip agent and facilitating the yield of yarn, in proportions of less than 10% by weight and preferably less than or equal to 5% by weight. The presence of this(these) agent(s) prevents any important rubbing of the filaments on the sizing device when the filaments are drawn at high speed (more than 40 m/s) and/or when they are very thin, these agents, however, being expensive and possibly resulting in a decrease in the mechanical properties of the composites. The said agent(s) can be chosen from the following components: silicones, siloxanes or polysiloxanes such as glycidyl(n)polydimethylsiloxane, alpha-omega-acryloxypolydimethylsiloxane, etc., silicone derivatives such as silicone oils, etc.

The sizing can also comprise, as additive, at least one agent for adaptation to the materials to be reinforced, in the case of cement materials in particular.

In general, the glass yarns are coated with the sizing composition defined above according to the following process: a plurality of molten glass threads, flowing from a plurality of orifices arranged at the base of one or more dies, is drawn in the form of one or more sheets of continuous filaments, the filaments are then assembled into one or more yarns which are collected on a moving support, the said process consisting in depositing at least some of the sizing composition defined above on the surface of the filaments during drawing, the yarn(s) being coated with the complete composition at the very latest when the yarn(s) are being collected.

The sizing composition according to the invention can be deposited in one or more steps. When the composition polymerizes under the effect of a heat treatment above 80° C., it can be deposited in one step on the surface of the filaments during drawing and before assembly of the filaments into yarns. When this composition polymerizes at room temperature, it is preferably deposited on the filaments and/or on the yarn(s) in the form of at least two separate stable compositions, these separate compositions being mixed on the yarn(s) or, at the very earliest, just before they are jointly deposited, and thus forming the sizing composition.

The sizing composition (if, for example, it is deposited in a single step) or the compositions needed to form the sizing composition (if it is deposited in several steps) advantageously has (have), at the time of deposition on the filaments, a viscosity of less than or equal to 0.4 Pa.s (400 cP) and preferably less than or equal to 0.2 Pa.s (200 cP), so as to be compatible with the conditions for obtaining the glass yarns imposed by the direct process, the viscosity of the composition(s) being chosen as a function of the drawing speed and of the diameter of the filaments which are to cross it (them). The said composition(s) also has (have) a wetting speed on the filaments or yarn(s) which is compatible with the drawing speed. When this (these) composition(s) is (are) deposited on the filaments, it (they) is (are) distributed rapidly over their entire surface and form(s) a protective film, in particular for protection against abrasion, for each of them. The yarn(s) obtained by assembling the filaments thus consist(s) of coated filaments which can slip over each other. This (these) yarn(s) is (are) easy to handle and, when it (they) is (are) wound in the form of packages, it (they) is (are) easily extracted from the packages.

When the sizing composition according to the invention polymerizes at room temperature, the process is preferably performed according to the process described in the patent application filed in France on May 14, 1997 under the number 97/05926 (application FR 2,763,328), i.e. in the following way: a first stable composition, with a viscosity of between $0.5 \times 10^{-3}$ Pa.s (0.5 cP) and 0.25 Pa.s (250 cP) is deposited on the surface of the filaments, at least a second stable composition, introduced separately of the first and having a viscosity of between $0.5 \times 10^{-3}$ Pa.s (0.5 cP) and 0.3 Pa.s (300 cP), is deposited at the surface of the filaments or the yarn(s), at the very earliest during the deposition of the first composition and at the very latest when the yarn(s) are being collected, the difference in viscosity between the compositions deposited being less than 0.15 Pa.s (150 cP), the mixture of compositions deposited forming the sizing composition according to the invention and being capable of polymerizing at room temperature. The polymerization reaction can optionally be accelerated by a subsequent heat-treatment.

In the process described in the above paragraph, the term "stable composition" is intended mainly to refer to a "composition which does not polymerize without at least one other component being supplied", it being possible, in many cases, for this composition to be stored for several days at storage temperatures which can be up to 40 or 50° C., and the term "room temperature" is intended to mean "without supplying additional energy", this expression covering a range of temperatures below 60° C., generally from 15 to 45° C.

Moreover, in the present invention, the term "glass yarns" is intended to refer to glass-based yarns, i.e. not only yarns formed solely of glass filaments, but also yarns formed of glass filaments and of organic filaments, in particular of thermoplastic filaments. In the latter case, during drawing of the glass filaments, the organic filaments are simultaneously extruded and entrained (or the organic filaments obtained, for example, from packages are simultaneously introduced), the paths followed by the glass filaments and the organic filaments (or yarns) converging on one another before the said filaments are assembled into at least one mechanically driven composite yarn.

The yarns obtained according to the invention can optionally have a coating which is not polymerized until they are used in the manufacture of composites, or can have a coating which is partially or entirely polymerized. When the sizing composition coating the yarns polymerizes by heating, these yarns are generally subjected to a heat treatment, this treatment being carried out more or less rapidly after the sizing has been deposited. It is also possible to carry out a heat treatment of the sized yarns when the composition polymerizes at room temperature, if it is desired, for example, to accelerate the reaction to polymerize the composition. In general, the heat treatment is carried out independently of the drawing operation (devices thus not being necessary below each die), it being possible for this treatment to be carried out at different stages of the process after yielding the yarn.

When the yarns obtained are collected in the form of packages (rovings), the heat treatment can take place in particular on the said packages before unwinding the yarns. In this case, it is desirable for the turns of the yarn(s) constituting the said packages to have a crossing angle at least equal to 1.5° in order to avoid bonding between turns via the polymerized sizing, this bonding making the yarns difficult to unwind.

The yarns can also be collected on travelling receiver supports, in which case the optional heat treatment can take place, where appropriate, on the yarns distributed on the collection surface. For example, the yarns can be thrown by a member which also serves to draw them, towards the collection surface which moves transversely to the direction of the thrown yarns, in order to obtain a sheet of interwoven continuous yarns known as a "mat". Where appropriate, a binder (it being optionally possible for this binder to comprise and to supply the sizing with one (or more) specific catalyst(s) as mentioned above) may have been sprayed onto the mat and the optional heat treatment can allow both the binder and the sizing to be polymerized.

The yarns can also be chopped up before collection, by a member which also serves to draw them, the chopped yarns being collected on travelling receiver supports, in which case the optional heat treatment can take place on the chopped yarns distributed on the receiver supports.

The sized yarns can also be collected without having undergone a heat treatment and can be heat-treated subsequently. In particular, the yarns can be collected in the form of packages and can then be extracted from the said packages in order to undergo additional treatments (for example in order to be chopped by a member which also serves to mechanically drive them), it being possible for the heat treatment to take place on the yarns before, during or after the additional treatment(s).

Lastly, the sized yarns can be heat-treated after combination with an organic material during the production of a composite, the said material optionally comprising at least one specific catalyst as mentioned above. Depending on the organic material used, the heat treatment can be accompanied by a treatment with ultraviolet radiation, a treatment with a beam of electrons, etc.

The glass yarns coated with the sizing according to the invention have a loss on ignition of advantageously less than 3% by weight of the sized yarns, and preferably less than 1.5%. The small amount of sizing deposited on the yarn makes it possible to reduce considerably the problems of bonding between yarns, in particular when they are collected in the form of packages, and also allows better opening of the yarn during impregnation with a reinforcing material and is economically advantageous.

The sizing composition according to the invention is particularly suitable for the production of continuous yarns collected in the form of rovings, cakes, cops, mats, etc., or for the production of chopped yarns, these various yarns being composed of filaments with diameters which can range from 5 to about 24 microns. The sizing composition according to the invention is suitable in particular for the production of thin yarns (with a yarn count of less than 600 tex) collected in the form of rovings and used, for example, in weaving. The yarns obtained according to the invention can also be in the form of braiding, slithers, mats or networks, which may or may not be woven, etc. after one or more treatments (assembly, weaving, twisting, etc.) of the yarns obtained by assembling the filaments.

As desired according to the invention, the sizing composition does not require the use of a drying operation and makes the yarns particularly suitable for impregnation with reinforcing materials (as illustrated later in the examples), it thus being possible for these yarns to be used to make products such as fascia reinforcement grills, fabrics for vehicles, or hollow bodies by winding, or optionally other types of products. The yarns obtained according to the invention also have good tensile strength properties.

The yarns obtained according to the invention can advantageously be combined with various reinforcing materials in order to make composite objects which have good mechanical properties. The composition according to the invention makes the yarns particularly compatible with reinforcing materials, especially with organic materials and in particular epoxy or polyester materials, but also with inorganic materials such as cement materials.

The composites according to the invention are advantageously obtained by combining at least glass yarns according to the invention and at least one organic and/or inorganic material, the glass content in these composites generally being between 30 and 70% by weight.

Other advantages and characteristics of the invention will become apparent in the light of the examples which follow, giving, on an illustrative but non-exhaustive basis, sizing compositions according to the invention and characteristics of the yarns coated with these compositions or characteristics of composites comprising the said yarns.

EXAMPLE 1

Filaments 14 microns in diameter, obtained by drawing molten glass threads, are coated with a first stable composition A and then with a second stable composition B, after which they are assembled into yarns and wound in the form of rovings with a mass of 9.1 kg (outside diameter of the package of 230 mm), so as to obtain yarns coated with a sizing, formed of the mixture of two compositions A and B, having the following composition expressed as percentages by weight:

Components supplied by composition A:

| | |
|---|---|
| dipropoxylated neopentyl glycol diacrylate[1] (reagent) | 20.0% |
| 2-(2-ethoxyethoxy)ethyl acrylate[2] (reagent) | 15.0% |
| gamma-methacryloxypropyl trimethoxysilane[3] coupling agent (reagent) | 15.0% |

Components supplied by composition B:

| | |
|---|---|
| 2,4,6-tri-dimethylaminomethylphenol[4] (catalyst) | 3.0% |
| polybutadiene containing 2 free amine functions, with an | 10.0% |

-continued

| | |
|---|---|
| average molecular weight of 1200[5] (reagent) | |
| isophoronediamine (reagent) | 12.0% |
| textile agent based on mineral oils and surfactants[6] (additive) | 15.0% |
| gamma-aminopropyltriethoxysilane[7] coupling agent (reagent) | 10.0% |

Composition A has a viscosity (measured on a Sofraser Mivi 4000 machine sold by the company Sofraser) of $7.8 \times 10^{-3}$ Pa.s (7.8 cP) at 20° C. and composition B has a viscosity of $82.4 \times 10^{-3}$ Pa.s (82.4 cP) at 20° C.

The sizing composition according to the present example contains no solvent and comprises 82% of polymerizable components, about 87% of the said polymerizable components having a molecular mass of less than 750. Furthermore, about 51% of the polymerizable components have at least two reactive functions chosen from acrylic, methacrylic, primary amine and secondary amine functions. Moreover, the ratio r of this composition is 0.64.

The yarns obtained have a yarn count of 300 tex and a loss on ignition of 0.65%.

The yarns are then extracted from the packages in order to measure their tensile breaking strength under the conditions defined by ISO standard 3341. The tensile breaking strength, measured on 8 to 10 test pieces, is about 41 g/tex (standard deviation of 2 g/tex).

The abrasion resistance of the yarns is also evaluated by weighing the amount of flock formed after passing the yarns over a series of cylindrical ceramic tension rails. For different yarns coated with the sizing described in the present example, the amount of flock after the test is about 32 mg per kg of yarn tested.

For comparative purposes, yarns coated with an aqueous sizing based on an emulsion of epoxy resin, silanes and surfactants, these yarns being dried according to ordinary methods, can form 200 or even 500 mg of flock per kg of yarn.

Lastly, the rigidity or stiffness of the yarns is measured according to ISO standard 3375. The stiffness of the yarns, measured on 5 test pieces, is 60 mm before passage over tension rollers (in particular those used to unwind the yarns), and is 60 mm after passage over six tension rollers. The values measured, and most particularly the value measured after passage over the rollers, make it possible to predict the capacity for impregnation of the yarns and thus their capacity for the manufacture of articles such as fascia reinforcement grills, fabrics for vehicles, and hollow bodies by winding. In general, a sized glass yarn has a capacity for impregnation which is sufficient to allow its use in the manufacture of the abovementioned articles if the value measured after passage over the rollers is less than 100 mm. Furthermore, the lower the stiffness values (the lowest value which can be obtained being about 60 mm), the better the capacity of the yarn for impregnation and for the manufacture of the abovementioned articles. Values close to 120–130 mm or less than 120 mm for the stiffness measured before passage over the rollers, and values close to 60 mm for the stiffness measured after passage over the rollers, are generally particularly satisfactory values.

EXAMPLE 2

Filaments 14 microns in diameter, obtained by drawing molten glass threads, are coated with a first stable composition A and then with a second stable composition B, after which they are assembled into yarns and are wound in the form of cakes with a mass of 9.4 kg (outside diameter of 330 mm), so as to obtain yarns coated with a sizing, formed of the mixture of the two compositions A and B, having the following composition expressed as percentages by weight:

Components supplied by composition A:

| | |
|---|---|
| triethoxylated trimethylolpropane triacrylate[8] (reagent) | 19.0% |
| dipropoxylated neopentyl glycol diacrylate[1] (reagent) | 25.0% |
| gamma-methacryloxypropyl trimethoxysilane[3] coupling agent (reagent) | 10.0% |

Components supplied by composition B:

| | |
|---|---|
| 2,4,6-tri-dimethylaminomethylphenol[4] (catalyst) | 4.0% |
| product based on isophoronediamine[9] (reagent) | 19.0% |
| textile agent based on mineral oils[10] (additive) | 15.0% |
| N-(beta-aminoethyl)-gamma-aminopropyltrimethoxysilane[11] coupling agent (reagent) | 8.0% |

The sizing composition according to the present example contains no solvent and comprises 81% of polymerizable components, these polymerizable components all having a molecular mass of less than 750; furthermore, more than 70% of the polymerizable components contain at least two reactive functions chosen from acrylic, methacrylic, primary amine and secondary amine functions. Moreover, the ratio r of this composition is 1.45.

The yarns obtained have a yarn count of 136 tex and a loss on ignition of 0.40%. The tensile breaking strength of the yarns, measured as in Example 1, is about 51 g/tex (standard deviation of 2 g/tex).

The abrasion resistance of the yarns is also evaluated as in Example 1. For the yarns according to the present example, the amount of flock after the test is less than 1 mg per kg of yarn tested.

Moreover, the stiffness of the yarns, measured as in Example 1, is 90 mm before passing over the rollers and 60 mm after passing over the rollers.

EXAMPLE 3

Filaments 14 microns in diameter, obtained by drawing molten glass yarns, are coated with sizing having the following composition, expressed as percentages by weight:

| | |
|---|---|
| 2-(2-ethoxyethoxy)ethyl acrylate[2] (reagent) | 20.0% |
| propoxylated glyceryl triacrylate[12] (reagent) | 30.0% |
| mixture of benzene-1,3-dimethanamine, trimethylhexanediamine and p-tert-butylphenol[13] (reagent) | 5.0% |
| N-2-aminoethylmorpholine (reagent) | 5.0% |
| blocked silane isocyanate coupling agent[14] (additive) | 15.0% |
| gamma-aminopropyltriethoxysilane[7] coupling agent (reagent) | 10.0% |
| textile agent based on mineral oils[15] (additive) | 15.0% |

The filaments are then assembled into yarns, which are wound in the form of cakes with a mass of 9.4 kg (outside diameter of 330 mm), and the rovings are then heated at 110° C. for 8 hours. The yarns obtained have a yarn count of 136 tex and a loss on ignition of 0.64%.

The sizing composition according to the present example contains no solvent and comprises 70% of polymerizable components, these polymerizable components all having a molecular mass of less than 750; furthermore, more than 46% of the polymerizable components contain at least two reactive functions chosen from acrylic, methacrylic, primary amine and secondary amine functions. Moreover, the ratio r of this composition is 1.61.

The tensile breaking strength of the yarns extracted from the packages, measured as in Example 1, is about 53 g/tex.

Moreover, the stiffness of the yarn, measured as in Example 1, is 130 mm before passing over the rollers and 70 mm after passing over the rollers.

EXAMPLE 4

Filaments 14 microns in diameter, obtained by drawing molten glass threads, are coated with sizing with the following composition, expressed as percentages by weight:

| | |
|---|---|
| dipropoxylated neopentyl glycol diacrylate[1] (reagent) | 20.0% |
| hexanediol diacrylate[16] (reagent) | 20.0% |
| alkoxylated aliphatic ester diacrylate[17] (reagent) | 30.0% |
| isophoronediamine (reagent) | 15.0% |
| gamma-aminopropyltriethoxysilane[7] coupling agent (reagent) | 5.0% |
| isopropyl palmitate textile agent (additive) | 10.0% |

The filaments are then assembled into yarns, which are wound in the form of cakes with a mass of 9.4 kg (outside diameter of 330 mm) and the rovings are then heated at 140° C. for 8 hours. The yarns obtained have a yarn count of 136 tex and a loss on ignition of 0.6%.

The sizing composition according to the present example contains no solvent and comprises 90% of polymerizable components, these polymerizable components all having a molecular mass of less than 750; furthermore, about 94% of the polymerizable components contain at least two reactive functions chosen from acrylic, methacrylic, primary amine and secondary amine functions.

The tensile breaking strength of the yarns extracted from the packages, measured as in Example 1, is about 55 g/tex.

Moreover, the stiffness of the yarn, measured as in Example 1, is 120 mm before passing over the rollers and 65 mm after passing over the rollers.

EXAMPLE 5

Filaments 14 microns in diameter, obtained by drawing molten glass threads, are coated with a first stable composition A and then with a second stable composition B, after which they are assembled into fibres and wound in the form of rovings with a mass of 9.6 kg, so as to obtain yarns coated with a sizing, formed of the mixture of the two compositions A and B, having the following composition, expressed as percentages by weight:

Components supplied by composition A:

| | |
|---|---|
| triethoxylated trimethylolpropane triacrylate[8] (reagent) | 22.0% |
| hexanediol diacrylate[16] (reagent) | 30.0% |

Components supplied by composition B:

| | |
|---|---|
| 2,4,6-tri-dimethylaminomethylphenol[4] (catalyst) | 3.0% |
| N-(beta-aminoethyl)-gamma-aminopropyltrimethoxysilane[11] coupling agent (reagent) | 12.0% |

-continued

| | |
|---|---|
| isopropyl palmitate textile agent (additive) | 8.0% |
| 2-(2-aminoethyl)aminoethanol (reagent) | 25.0% |
| Composition A has a viscosity of 21.5 × 10⁻³ Pa.s (21.5 cP) at 20° C. and composition B has a viscosity of 45 × 10⁻³ Pa.s (45 cP) at 20° C. | |

The sizing composition according to the present example contains no solvent and comprises 89% of polymerizable components, these polymerizable components all having a molecular mass of less than 750; furthermore, 100% of the polymerizable components contain at least two reactive functions chosen from acrylic, methacrylic, primary amine and secondary amine functions. Moreover, the ratio r of this composition is 0.48.

The yarns obtained have a yarn count of about 330 tex and a loss on ignition of 0.72%. The tensile breaking strength of the yarns, measured as in Example 1, is about 32 g/tex (standard deviation of 2 g/tex).

The abrasion resistance of the yarns is also evaluated as in Example 1. For the yarns according to the present example, the amount of flock after the test is about 150 mg per kg of yarn tested.

Moreover, the stiffness of the yarn, measured as in Example 1, is 107 mm before passing over the rollers and is 82 mm after passing over the rollers.

EXAMPLE 6

Filaments 14 microns in diameter, obtained by drawing molten glass threads, are coated with a first stable composition A and then with a second stable composition B, after which they are assembled into yarns and wound in the form of rovings with a mass of 9.8 kg, so as to obtain yarns coated with a sizing, formed of the mixture of the two compositions A and B, having the following composition, expressed as percentages by weight:

Components supplied by composition A:

| | |
|---|---|
| triethoxylated trimethylolpropane triacrylate[8] (reagent) | 28.0% |
| gamma-methacryloxypropyltrimethoxysilane[3] coupling agent (reagent) | 12.0% |
| $C_{12}$–$C_{14}$ alkyl monoglycidyl ether[18] (reagent) | 10.0% |

Components supplied by composition B:

| | |
|---|---|
| mixture of benzene-1,3-dimethanamine, trimethylhexanediamine and p-tert-butylphenol[13] (reagent) | 25.0% |
| N-(benzyl)aminoethylaminopropyltrimethoxysilane[19] coupling agent (reagent) | 12.0% |
| 2,4,6-tri-dimethylaminomethylphenol[4] (catalyst) | 3.0% |
| textile agent based on mineral oils[15] (additive) | 10.0% |

The sizing composition according to the present example contains no solvent and comprises 87% of polymerizable components, these polymerizable components all having a molecular mass of less than 750; furthermore, at least 60% of the polymerizable components contain at least two reactive functions chosen from acrylic, methacrylic, primary amine and secondary amine functions. Moreover, the ratio r of this composition is 1.1.

The yarns obtained have a yarn count of 300 tex and a loss on ignition of 0.47%. The tensile breaking strength of the yarns, measured as in Example 1, is about 58 g/tex (standard deviation of 2 g/tex).

The abrasion resistance of the yarns is also evaluated as in Example 1. For the yarns according to the present example, the amount of flock after the test is less than 1 mg per kg of yarn tested.

Moreover, the stiffness of the yarn, measured as in Example 1, is 135 mm before passing over the rollers and is 68 mm after passing over the rollers.

COMPARATIVE EXAMPLE 1

Filaments 10 microns in diameter, obtained by drawing molten glass threads, are coated with a first stable composition A and then with a second stable composition B, after which they are assembled into yarns and wound in the form of cakes with a mass of 12.5 kg, so as to obtain yarns coated with a sizing, formed of the mixture of the two compositions A and B, having the following composition, expressed as percentages by weight:

Components supplied by composition A:

| | |
|---|---|
| trimethylolpropane triglycidyl ether[20] (reagent) | 18.0% |
| butanediol diglycidyl ether[21] (reagent) | 12.0% |
| $C_{12}$–$C_{14}$ alkyl monoglycidyl ether[18] (reagent) | 12.0% |
| gamma-glycidoxypropyltrimethoxysilane[22] coupling agent (reagent) | 18.0% |

Components supplied by composition B:

| | |
|---|---|
| isophoronediamine (reagent) | 6.0% |
| mixture of benzene-1,3-dimethanamine, trimethylhexanediamine and p-tert-butylphenol[13] (reagent) | 10.0% |
| 2,4,6-tri-dimethylaminomethylphenyl[4] catalyst | 2.0% |
| textile agent based on mineral oils[15] (additive) | 12.0% |
| isopropyl palmitate textile agent (additive) | 10.0% |

Composition A has a viscosity of 16.2×10⁻³ Pa.s (16.2 cP) at 20° C. and composition B has a viscosity of 27×10⁻³ Pa.s (27 cP) at 20° C.

The sizing composition according to the present example comprises, as polymerizable components, only components containing one or more epoxy functions and primary or secondary amine components.

The yarns obtained have a yarn count of about 169 tex and a loss on ignition of 0.81%. The tensile breaking strength of the yarns, measured as in Example 1, is about 59.7 g/tex.

The abrasion resistance of the yarns is also evaluated as in Example 1. For the yarns according to the present example, the amount of flock after the test is about 8 mg per kg of yarn tested.

Moreover, the stiffness of the yarn, measured as in Example 1, is 180 mm before passing over the rollers and is 145 mm after passing over the rollers.

COMPARATIVE EXAMPLE 2

Filaments 14 microns in diameter, obtained by drawing molten glass threads, are coated with a first stable composition A and then with a second stable composition B, after which they are assembled into yarns and wound so as to obtain yarns coated with a sizing, formed of the mixture of the two compositions A and B, having the following composition, expressed as percentages by weight:

Components supplied by composition A:

| | |
|---|---|
| trimethylolpropane triglycidyl ether[20] (reagent) | 12.5% |
| butanediol diglycidyl ether[23] (reagent) | 18.0% |
| $C_{12}$–$C_{14}$ alkyl monoglycidyl ether[18] (reagent) | 10.0% |
| bisphenol A diglycidyl ether[24] (reagent) | 10.0% |
| gamma-methacryloxypropyltrimethoxysilane[3] coupling agent (reagent) | 16.5% |

Components supplied by composition B:

| | |
|---|---|
| N-(benzyl)aminoethylaminopropyltrimethoxysilane[19] coupling agent (reagent) | 4.0% |
| mixture of benzene-1,3-dimethanamine, trimethylhexanediamine and p-tert-butylphenol[13] (reagent) | 11.0% |
| 2,4,6-tri-dimethylaminomethylphenol[4] catalyst | 2.0% |
| textile agents based on mineral oils[15] (additive) | 16.0% |

Composition A has a viscosity of $17 \times 10^{-3}$ Pa.s (17 cP) at 22° C. and composition B has a viscosity of $32 \times 10^{-3}$ Pa.s (32 cP) at 22° C.

The sizing composition according to the present example comprises less than 12% of polymerizable components containing at least two reactive functions chosen from acrylic, methacrylic, primary amine and secondary amine functions.

The yarns obtained have a yarn count of about 300 tex and a loss on ignition of 0.61%. The tensile breaking strength of the yarns, measured as in Example 1, is about 42 g/tex (standard deviation of 0.8 g/tex).

The abrasion resistance of the yarns is also evaluated as in Example 1. For the yarns according to the present example, the amount of flock after the test is less than 1 mg per kg of yarn tested.

Moreover, the stiffness of the yarn, measured as in Example 1, is 160 mm before passing over the rollers and is 127 mm after passing over the rollers.

It is observed in the above examples that the yarns coated with sizing according to the invention are easy to handle and have good tensile strength properties.

The yarns obtained according to the invention moreover have a low loss on ignition, good abrasion resistance and allow effective reinforcement of organic and/or inorganic materials.

The low levels of flock obtained during the abrasion resistance tests on the yarns and the good tensile strength properties of these yarns also make it possible to state that these yarns according to the invention have good integrity. The yarns obtained also have a capacity for impregnation which is considerably better than other anhydrous compositions, such as compositions based essentially on components containing epoxy function(s) and on amine components.

The yarns according to the invention can be used for various applications, for example to manufacture hollow bodies by rolling, fabrics for vehicles, fascia reinforcement grills or other types of composite products.

(1) Sold under the reference "SR 9003" by the company Cray-Valley
(2) Sold under the reference "SR 256" by the company Cray-Valley
(3) Sold under the reference "Silquest A 174" by the company OSi
(4) Sold under the reference "Actiron NX3" by the company Protex
(5) Sold under the reference "Poly BD diamine" by the company Atochem
(6) Sold under the reference "Nopcostat FT 504" by the company Henkel Nopco
(7) Sold under the reference "Silquest A 1100" by the company OSi
(8) Sold under the reference "SR 454" by the company Cray-Valley
(9) Sold under the reference "Grilonit H 82044" by the company EMS Chemie
(10) Sold under the reference "Lubronyl GF" by the company RP Bevaloid
(11) Sold under the reference "Silquest A 1120" by the company OSi
(12) Sold under the reference "SR 9021" by the company Cray-Valley
(13) Sold under the reference "Ancamine 2089 M" by the company Air Products
(14) Sold under the reference "Silquest Y 11778" by the company OSi
(15) Sold under the reference "Torfil LA 4" by the company Lamberti
(16) Sold under the reference "HDDA" by the company UCB
(17) Sold under the reference "SR 9209" by the company Cray-Valley
(18) Sold under the reference "Araldite DY 0391" by the company Ciba-Geigy
(19) Sold under the reference "Silquest Y 11899" by the company OSi
(20) Sold under the reference "Araldite DY 0396" by the company Ciba-Geigy
(21) Sold under the reference "Araldite DY 0397" by the company Ciba-Geigy
(22) Sold under the reference "Silquest A 187" by the company OSi
(23) Sold under the reference "Heloxy 67" by the company Shell
(24) Sold under the reference "Araldite GY 285" by the company Ciba-Geigy

What is claimed is:

1. Glass yarn coated with a sizing composition consisting of a solution whose solvent content is less than 5% by weight, this solution comprising at least 60% by weight of polymerizable components, at least 60% by weight of these polymerizable components being components with a molecular mass of less than 750 and these polymerizable components comprising at least one polymerizable mixture of:

component(s) containing at least one reactive acrylic function and/or at least one reactive methacrylic function, and component(s) containing at least one reactive primary amine function and/or at least one reactive secondary amine function, wherein at least 20% of the polymerizable components contain at least two reactive functions selected from the group consisting of acrylic, methacrylic, primary amine and secondary amine functions, and wherein the ratio r between the number of (meth) acrylic reactive sites and the number of primary and/or secondary amine reactive sites in presence is between 0.2 and 3.

2. Glass yarn according to claim 1, wherein more than 50% of the polymerizable components contain at least one reactive function selected from the group consisting of acrylic, methacrylic, primary amine and secondary amine functions.

3. Glass yarn according to claim 1, wherein the mixture comprises at least one component containing at least two reactive functions selected from the group consisting of acrylic and methacrylic functions.

4. Glass yarn according to claim 1, wherein the proportion of component(s) containing at least one acrylic reactive function and/or at least one methacrylic reactive function is between 25 and 80% by weight of the sizing composition.

5. Glass yarn according to claim 1, wherein the proportion of component(s) containing at least one primary amine reactive function and/or at least one secondary amine reactive function is between 5 and 55% by weight of the sizing composition.

6. Glass yarn according to claim 1, wherein the sizing composition comprises at least one catalyst in proportions of less than 8% by weight.

7. Glass yarn according to claim 1, wherein the composition also comprises at least one coupling agent in proportions of between 0 and 30% by weight.

8. Glass yarn according to claim 1, wherein the composition also comprises at least one textile agent in proportions of between 0 and 25% by weight.

9. Glass yarn according to claim 1, wherein the composition also comprises at least one film-forming agent in proportions of less than 10% by weight.

10. Composite comprising at least one organic and/or inorganic material and sized glass yarns, wherein said composite comprises, at least partly, glass yarns sized according to one of claims 1 to 5 and 6 to 9.

11. Sizing composition for a glass yarn, consisting of a solution whose solvent content is less than 5% by weight, this solution comprising at least 60% by weight of polymerizable components, at least 60% by weight of these polymerizable components being components with a molecular mass of less than 750 and these polymerizable components comprising at least one polymerizable mixture of:

component(s) containing at least one reactive acrylic function and/or at least one reactive methacrylic function, and component(s) containing at least one reactive primary amine function and/or at least one reactive secondary amine function, wherein at least 20% of the polymerizable components contain at least two reactive functions selected from the group consisting of acrylic, methacrylic, primary amine and secondary amine functions, and wherein the ratio r between the number of (meth) acrylic reactive sites and the number of primary and/or secondary amine reactive sites in presence is between 0.2 and 3.

12. Process for producing sized glass yarns, in which a plurality of molten glass threads, flowing from a plurality of orifices arranged at the base of one or more dies, is drawn in the form of one or more sheets of continuous filaments, the filaments are then assembled into one or more yarns which are collected on a moving support, the said process comprising depositing at least a part of the sizing composition according to claim 11 on the surface of the filaments during drawing and before assembly of the filaments into yarns, the yarn(s) being coated with the complete composition at the very latest when the yarn(s) are being collected.

13. Process according to claim 12, wherein the sizing composition is deposited in one step on the surface of the filaments during drawing and before assembly of the filaments into yarns.

14. Process according to claim 12, wherein a first stable composition, with a viscosity of between $0.5 \times 10^{-3}$ Pa.s and 0.25 Pa.s is deposited on the surface of the filaments, at least a second stable composition, introduced separately of the first and having a viscosity of between $0.5 \times 10^{-3}$ Pa.s and 0.3 Pa.s, is deposited on the surface of the filaments or the yarn(s), at the very earliest during the deposition of the first composition and at the very latest when the yarn(s) are being collected, the difference in viscosity between the compositions deposited being less than 0.15 Pa.s, the mixture of compositions deposited forming said sizing composition and being capable of polymerizing at room temperature.

* * * * *